United States Patent
Bonk et al.

(10) Patent No.: US 6,296,814 B1
(45) Date of Patent: Oct. 2, 2001

(54) HYDROCARBON FUEL GAS REFORMER ASSEMBLY FOR A FUEL CELL POWER PLANT

(75) Inventors: Stanley P. Bonk; Glenn W. Scheffler, both of Tolland; Peter F. Foley, Manchester; Thomas J. Corrigan, Vernon; Richard A. Sederquist, Newington; Francis A. Kocum, Glastonbury, all of CT (US)

(73) Assignee: International Fuel Cells, L.L.C., So. Windsor, CT (US)

( * ) Notice: Subject to any disclaimer, the term of this patent is extended or adjusted under 35 U.S.C. 154(b) by 0 days.

(21) Appl. No.: 09/190,858

(22) Filed: Nov. 10, 1998

(51) Int. Cl.$^7$ .................................. B01J 8/02; B01J 7/00
(52) U.S. Cl. .......................... 422/196; 422/192; 422/197; 48/61; 48/76
(58) Field of Search ..................... 422/192, 197, 422/196, 181, 218; 48/89, 94, 127.7, 127.9, 119

(56) References Cited

U.S. PATENT DOCUMENTS

| | | | |
|---|---|---|---|
| 3,775,064 | * | 11/1973 | Berger et al. . |
| 4,083,695 | * | 4/1978 | Haese et al. ...................... 422/201 |
| 4,098,589 | * | 7/1978 | Buswell et al. ....................... 48/94 |
| 4,169,879 | * | 10/1979 | Descoins et al. ................... 422/220 |
| 5,565,009 | * | 10/1996 | Ruhl et al. ...................... 48/197 R |
| 5,567,398 | * | 10/1996 | Ruhl et al. ......................... 422/197 |
| 5,997,596 | * | 12/1999 | Joshi et al. ........................ 48/198.1 |

OTHER PUBLICATIONS

"Periphery" definition The American Heritage ® Dictionary of the English Language, Third Edition copyright 1992 by Houghton Mifflin Company.*

* cited by examiner

Primary Examiner—Marian C. Knode
Assistant Examiner—Alexa A. Doroshenk
(74) Attorney, Agent, or Firm—William W. Jones

(57) ABSTRACT

A compact and efficient fuel reformer which is operable to produce a hydrogen-enriched process fuel from a raw fuel such as natural gas, or the like includes a compact array of catalyst tubes which are contained in a heat-insulated housing. The catalyst tube array preferably includes a multitude of catalyst tubes that are arranged in a hexagonal array. The housing includes internal hexagonal thermal insulation so as to ensure even heating of the catalyst tubes. The diameter of the tubes is sized so that spacing between adjacent tubes in the array can be minimized for efficient heat transfer. The interior of each of the catalyst tubes includes a hollow dead-ended central tube which serves as a fines trap for collecting catalyst fines that may become entrained in the fuel stream. The catalyst tubes are also provided with an upper frusto-conical portion which serves to extend the catalyst bed and provide a catalyst reserve. The assembly includes a side-fired startup burner which allows for an improved diffusion burner orifice array at the top of the reformer. The catalyst tubes are supported by side walls of the assembly in a manner that stabilizes the tubes in the assembly. In the assembly, the internal transverse manifold plates are tied together by portions of the tube assemblies so as to form a composite beam that supports the weight of the catalyst tube array.

10 Claims, 5 Drawing Sheets

HYDROCARBON FUEL GAS REFORMER ASSEMBLY FOR A FUEL CELL POWER PLANT

The U.S. Government has a paid-up license in this invention and the right in limited circumstances to require the patent owner to license others on reasonable terms as provided for by the terms of contract No. RX-7502-810-IFC awarded by the United States Department of Transportation through Georgetown University.

TECHNICAL FIELD

This invention relates to a catalytic reaction system. More particularly, this invention relates to a system having an array of catalyst tubes, each of which has an annular catalyst bed.

BACKGROUND OF THE INVENTION

Catalytic reaction apparatus have been commonly used in industry to produce industrial gases such as a hydrogen enriched fuel gas and are therefore well known in the art. The most common approach for producing hydrogen is the steam reforming process in which a raw fuel gas is mixed with steam and passed through catalyst beds disposed in a tubular reformer. Heat for this endothermic reaction is provided from a furnace in which the tubes are locoted in a widely spaced apart configuration.

As a result of the large size and limited operating flexibility characteristics of these industrial units, steam reforming technology was not successfully integrated for use with power plants that incorporated hydrogen consuming fuel cells until the successful application as disclosed in U.S. Pat. Nos. 4,098,587; 4,098,588 and 4,098,589. The new design represented by these patents consisted of a compact reaction apparatus with a number of important features that made it suitable for use within a fuel cell power plant.

Namely, it is a compact reaction apparatus for steam reforming a raw fuel that is mainly characterized by having: a plurality of vertical tubular reformers closely packed (by the then standard of the art) within a furnace and shielded so as to produce an evenly heated tube at any location within the array of tubes; having a burner cavity area and an enhanced heat transfer area; and having annular reformers incorporating regenerative heat transfer capability between the reaction products and the process stream.

This design resulted in a steam reformer apparatus that met the size and operating characteristic requirements of a fuel cell power plant while maintaining a high thermal efficiency that is necessary to ensure a competitive overall power plant operating efficiency.

While the design disclosed in the aforesaid patents was a milestone achievement for the application of hydrogen generation technology to fuel cell power plants, these early designs were in need of improvements to make it truly more compact, lighter in weight, more uniform in its heat distribution and catalyst bed stability. Chief among these problems is the need to develop an efficient supporting structure that keeps the tube bundle aligned and properly distributes the loading forces resulting from tubes and catalyst and ancillary equipment without undue weight penalty or complex and costly structural fixtures.

DISCLOSURE OF THE INVENTION

This invention relates to a compact and efficient reformer which is operable to produce a hydrogen-enriched process fuel from a raw fuel such as natural gas, or the like. The reformer of this invention includes a compact array of catalyst tubes which are contained in a heat-insulated housing. The catalyst tube array preferably includes a multitude of tubes that are arranged in a hexagonal array. The housing is preferably circular for manufacturing and structural efficiency, and the interior of the circular housing is fitted with a geometrically matching insulation. For example, when the hexagonal array of reformer tubes is employed, the insulation will provide a hexagonal perimeter which faces the reformer tube array. The outermost tubes in the array are thus equally efficiently insulated against heat loss. The diameter of the tubes is also sized so that spacing between adjacent tubes in the array can be minimized for efficient heat transfer. The stiff tube support structure maintains the critical spacing between tubes under dead weight loading at reformer operating temperatures.

The interior of each of the catalyst tubes includes a hollow dead-ended central tube over which processed fuel is passed after leaving the catalyst reaction bed. The dead-ended tube serves as a fines trap for collecting catalyst fines which become entrained in the fuel stream as the latter passes through the catalyst bed. The catalyst tubes are also provided with an uppermost conical cap which serves to extend the catalyst bed so that an excess of catalyst can be loaded into the bed when the tubes are constructed and assembled. The assembled and closed catalyst tubes thus will contain an excess of catalyst so as to maintain a desired height to the catalyst beds even when catalyst slumping and settling occurs. Catalyst settling is also controlled by the respective size of the catalyst pellets and the radial thickness of the catalyst bed. In addition, the conical cap shape prevents the fluidization of the catalyst bed in the upper portion of the catalyst reaction zone by lowering the gas flow velocity as the flow area increases. This is important because fluidization leads to excessive settling and crushing of the catalyst in this region with each thermal cycle. This exacerbates the catalyst layer height loss that is desirable to minimize.

This design is also characterized by the use of a side-fired startup burner instead of a central-fired startup burner as has been previously used. The side-fired burner allows for an improved diffusion burner orifice array at the top of the reformer. Thus, a burner orifice array which is not interfered with by the centrally located startup burner is achieved so as to make the heat distribution from the diffusion burners more easily and efficiently achieved. It will be appreciated that the presence of a centrally located startup burner will disrupt the diffusion burner pattern and will create a void in the central portion of the upper,end of the furnace when the startup burner is shut down. This undesirable result does not occur when the side-fired startup burner of this invention is used.

The design is also characterized by the use of reformer tube caps having a thickness that is greater than conventionally used so as to provide an added temperature operating range because the operating range is limited mainly by corrosion and strength requirements. Increasing the thickness of the cap, which is disposed in the hottest part of the reformer tube, improves the capability of the reformer to deal with design and structural variations, and increases the safety margin of the design.

The catalyst tubes are supported by side walls of the assembly housing in a manner that stabilizes the tubes in the assembly, and allows the assembly to take advantage of assembly components which provide unique structural features affording improved strength and stiffness, and also the resistance to thermal stresses without increasing weight or volume. In the aforesaid U.S. Pat. No. 4,098,587, the weight of the catalyst tubes is supported by the bottom wall of the apparatus, which is also a pressure boundary for the vessel. In the assemblage of this invention, the internal transverse manifold plates are tied together by portions of the tube assemblies so as to form a composite beam that supports the weight of the catalyst tube array. The manifold plates and the tying tube assembly portions interact with each other in a manner which creates the structure and effect of a composite beam that transfers the load from the tubes out to the cylindrical side wall of the assembly. The resultant structure provides Increased load bearing strength in a manner similar to a honeycomb panel.

The two internal transverse manifold plates serve as face sheets of the honeycomb-like structure, in which the tube sections between the manifold plates serve as a core for the honeycomb-like structure. By freeing the bottom area of the assembly from the need to provide tube weight and load support, the bottom area can be utilized for other functions such as the additional capture of fines, or integrated heat exchange options. This is a desirable feature which enables the achievement of maximum packaging density in a weight and volume sensitive power plant design.

It is therefore an object of this invention to provide a more efficient and compact apparatus for reforming a fuel supply so as to adapt the latter for use in a fuel cell power plant.

It is a further object of this invention to provide an apparatus of the character described wherein the apparatus has a structural tube support configuration which efficiently transfers catalyst tube support loads to the existing cylindrical housing in the apparatus.

It is an additional object of this invention to provide an apparatus of the character described wherein catalyst bed compaction is remedied.

It is another object of this invention to provide an apparatus of the character described wherein improved heat transfer from fuel process burners to the catalyst tubes is provided.

It is yet another object of this invention to provide an apparatus of the character described wherein improved catalyst bed support is provided.

These and other objects and advantages of the invention will become more readily apparent from the following detailed description thereof when taken in conjunction with the accompanying drawings in which:

DETAILED DESCRIPTION OF THE INVENTION

Figure 1:
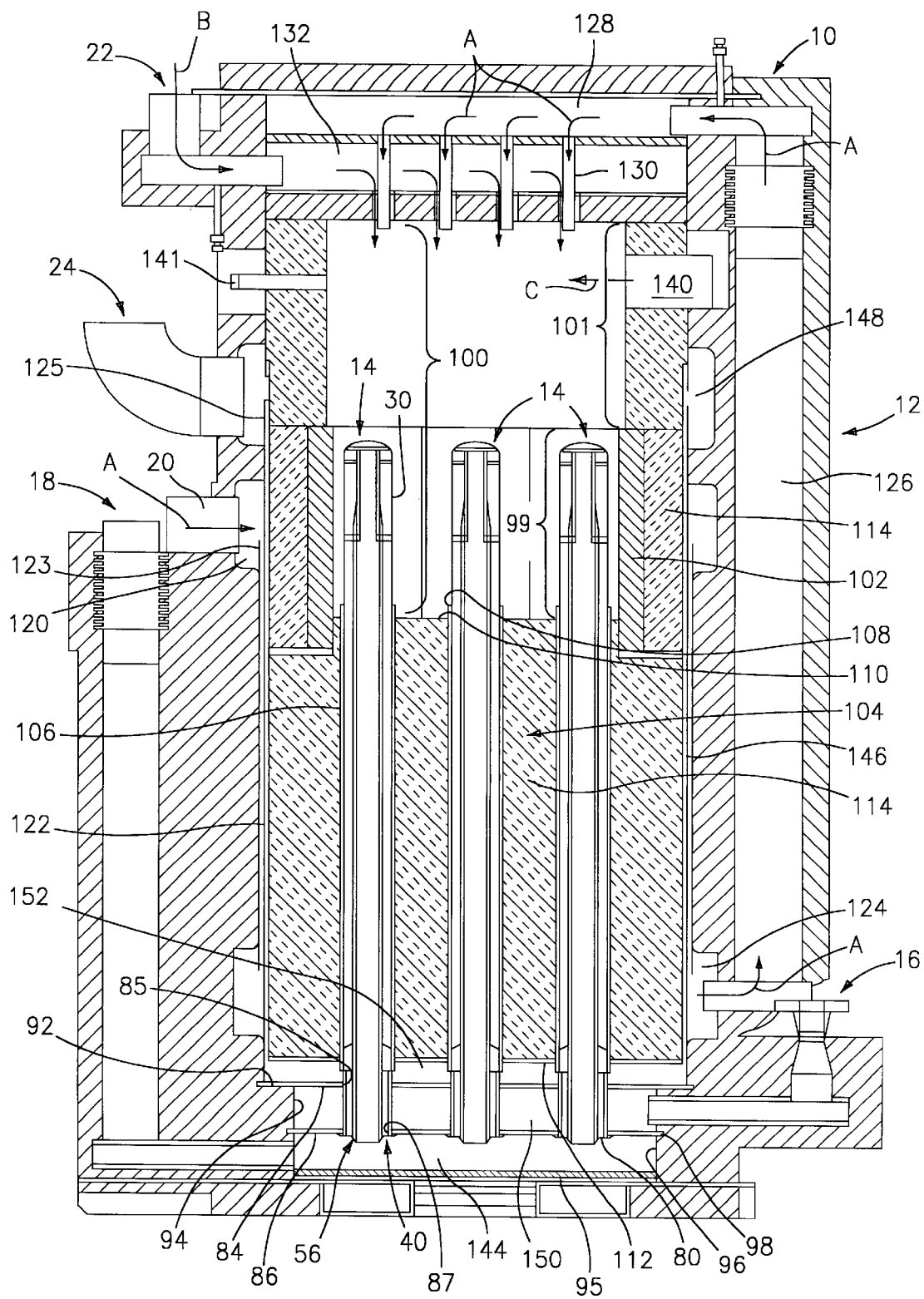
FIG. 1 is an axial cross-sectional view of a reformer assembly formed in accordance with this invention.
Figure 1A:
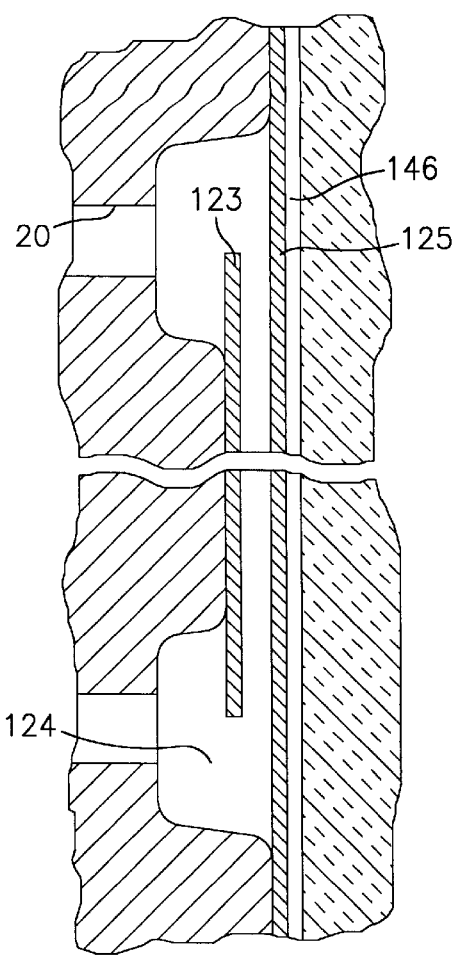
FIG. 1A is an enlarged and fragmented view of the annular fuel gas inlet passage shown in FIG. 1.

Referring now to the drawings, FIG. 1 discloses an embodiment of a reformer apparatus 10 which is formed in accordance with this invention, and which includes a housing 12 that contains a plurality of catalyst tubes 14 in which the processing of a raw hydrocarbon fuel stock takes place. The reformer apparatus 10 includes a raw fuel inlet 16 through which raw hydrocarbon fuel is introduced to the apparatus 10, and a reformed fuel outlet 18 through which the reformed hydrocarbon fuel is removed from the apparatus 10. The apparatus 10 further includes a burner fuel inlet 20 through which a burner fuel is introduced into the apparatus 10, and a burner air inlet 22 through which ambient air, or another source of oxygen, is introduced into the apparatus 10 in order to support combustion of the burner fuel so as to provide heat for the processing of the raw hydrocarbon fuel stock. A burner exhaust outlet 24 is provided to vent the burner fuel exhaust stream from the apparatus 10. In the drawings, arrows A and B indicate the direction of flow of the burner gases and burner air streams respectively. Arrows C and D indicate the direction of flow of the start burner gas stream and the process fuel being reformed, respectively.

Figure 2:
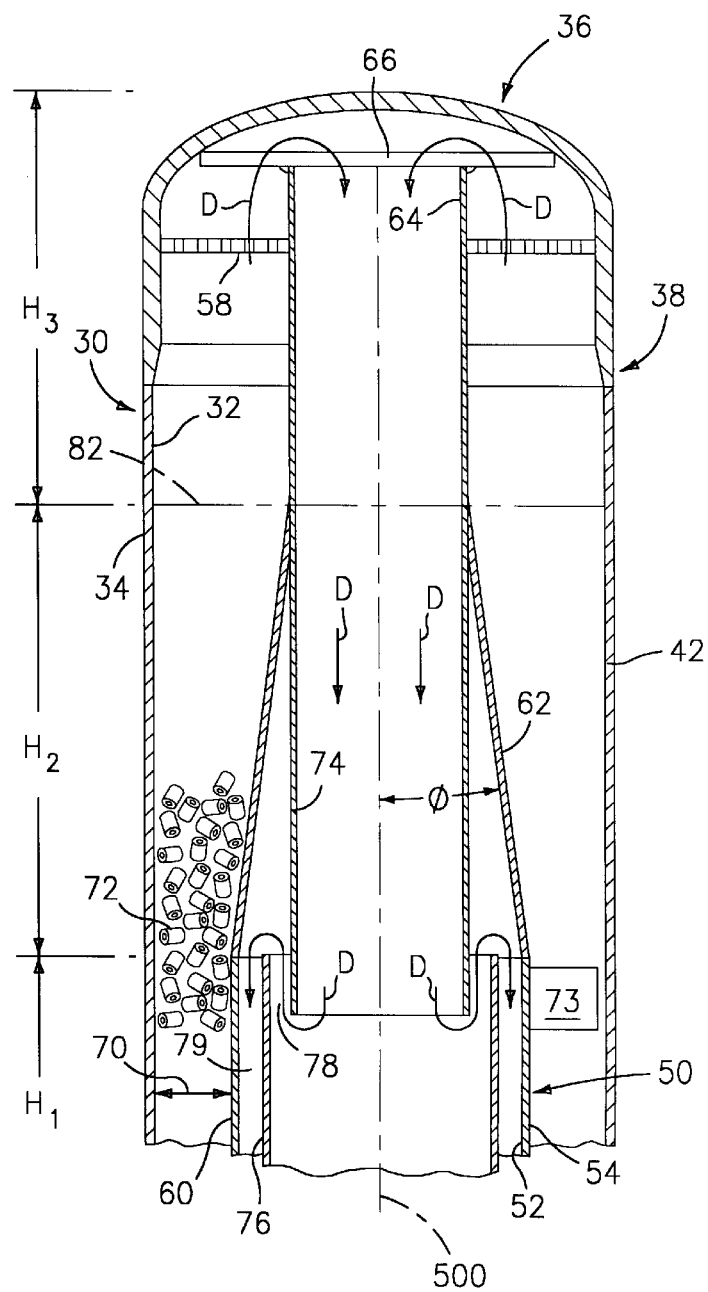
FIG. 2 is a fragmented axial cross-sectional view of the upper portion of the reformer assembly of FIG. 1.
Figure 3:
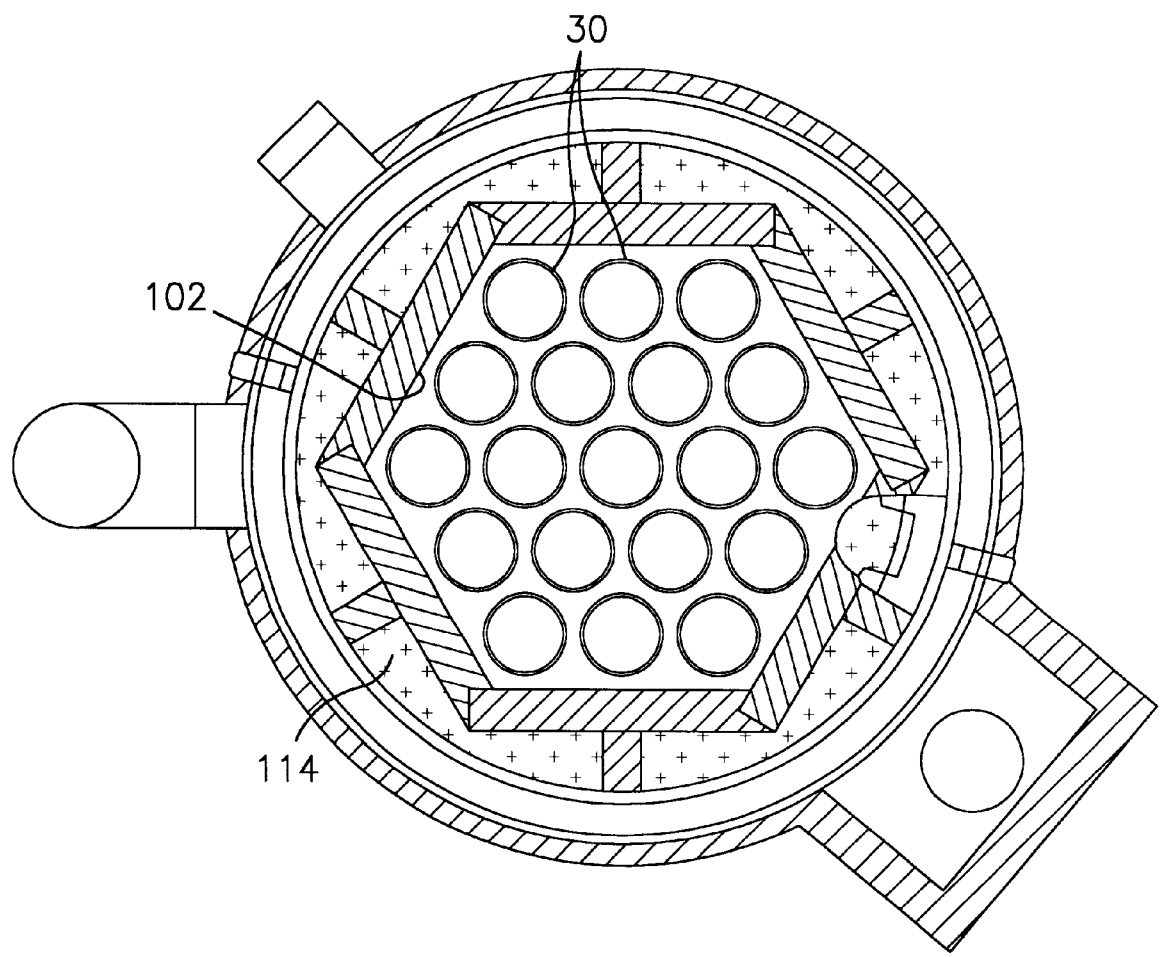
FIG. 3 is a transverse cross-sectional view of the reformer assembly.
Figure 4:
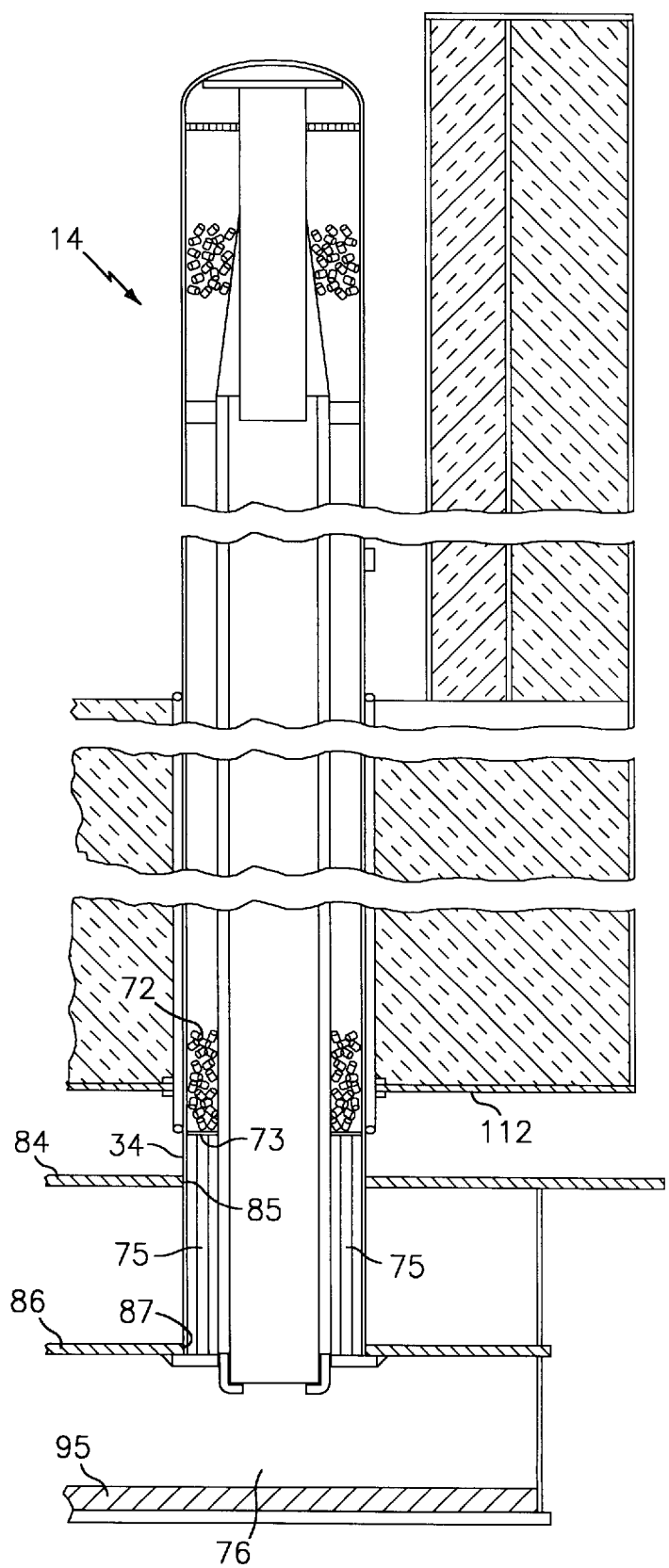
FIG. 4 is an axial cross sectional view of one of the catalyst tube assemblies illustrating the manner in which the catalyst tube assemblies are mounted in the reformer assembly.
Figure 5:
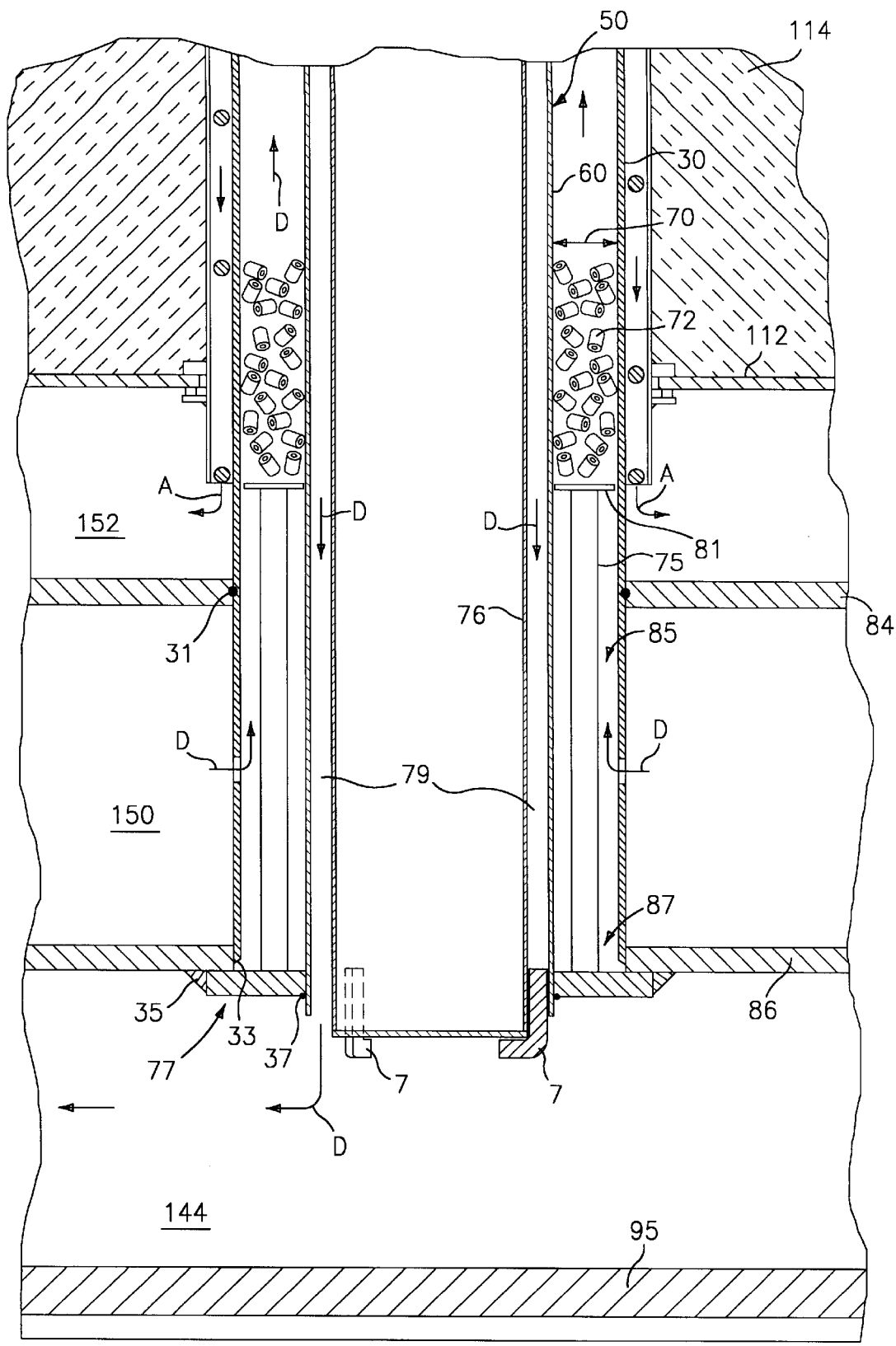
FIG. 5 is a fragmented axial cross sectional view of a lower portion of one of the catalyst tube assembly.

As shown in FIGS. 1, 2 and 3, there are nineteen individual catalyst tube assemblies 14 which are arranged in a closely packed hexagonal array. The catalyst tube assembly array has a central group of seven catalyst tube assemblies and an outer group of twelve catalyst tube assemblies. Each catalyst tube assembly 14 includes an outer reformer tube 30 having an inner surface 32 and an outer surface 34. Sealed upper ends 36 of the reformer tubes 30 are provided by end caps 38 which define uppermost portions of the reformer tubes 30. The reformer tubes 30 have lower ends 40 and tube bodies 42 which extend from the lower ends 40 to the end caps 38. Regenerator tubes 50 are positioned concentrically inside of the reformer tubes 30. The regenerator tubes 50 have inner and outer surfaces 52 and 54, respectively and extend from the lower ends 56 of the catalyst tube assemblies 14 to the upper ends 64 thereof. As seen in FIG. 2, the regenerator tubes 50 are formed in three major sections, which are: cylindrical body sections 60 which extend upwardly from the lower ends 40 a height $H_1$; frustoconically inwardly tapered Intermediate sections 62 which extend upwardly from the body sections 60 a height $H_2$; and smaller cylindrical upper sections 64 which extend upwardly from the upper end 82 of intermediate sections 62 a height $H_3$. The intermediate sections 62 have an angle of convergence Ø toward the axis 500 of the tube 30. The heights and angle are selected so that the extra catalyst volume which is located in the space $H_2$, will provide a catalyst reserve to compensate for the volume reduction in catalyst that occurs during thermal cycling, and also to limit fluidization of the catalyst bed and minimize pressure drop through the catalyst bed. The upper end of the upper section 64 of the regenerator tube 50 is open so that the gas stream from the catalyst bed may enter the tube 64 and 74 as indicated by the arrows D. A perforated plate 58 is secured to the tube 64 and allows the reformed gas to leave the upper end of the catalyst bed and enter the tube 64, 74. A cross member 66 in the form of a rod is positioned so that its ends may contact the inner surface of the end cap 38 so as to center the regenerator tube assembly 50 in the upper end of the reformer tube 30. The taper angle Ø in the medial section 62 is selected so as to fit the size, flow and pressure drop requirements for the unit.

An annular space 70 is defined between the inner surface of the reformer tube 30 and the outer surface of the regenerator tube 50. The space 70 has three major sections associated with and adjacent to the three major sections of the regenerator tube 50. In the exemplary embodiment, a lower section and an intermediate section. The intermediate section has a thickness which matches the lower section at its lower end and which increases in an upward direction. The upper section of the space 70 has a thickness further increasing in an upward direction in accordance with the taper of the upper section 64 of the regenerator tube 50. In the aforesaid embodiment of the invention, the majority of the annular space 70 contains a catalyst bed. The catalyst bed is formed from cylindrical pellets 72 having an outer surface formed of an appropriate catalytic material such as nickel. The regenerator tube 50 is formed with a plurality of spacers 73 which extend radially outwardly from the outer surface of the tube 50 along the regenerator tube body section 60. The spacers 73 maintain the regenerator tube 50 centered within the reformer tube 30.

A fines-collecting system comprising upper and lower interior tubes 74 and 76 is provided within the regenerator tube 50. The upper tube 74 is open at its upper and lower ends. The upper end of the upper tube 74 is welded to the inner surface of the intermediate section 62 of the regenerator tube 50 and is recessed below the upper end of the intermediate section 62. The upper end of the lower tube 76 is substantially level with the upper end of the regenerator tube body section 60. The lower end of the upper tube 74 extends slightly into the lower tube 76. The inner diameter of the lower tube 76 is sufficient to accommodate the outer diameter of the upper tube 74 and define an annular space 78 laterally between the tubes 74 and 76. The closed lower end of the lower tube protrudes beyond the lower end of the body section 60 of the regenerator tube 50. An annular space 79 is defined between the outer surface of the lower tube 76 and the inner surface of the regenerator tube 50 to serve as a regeneration chamber. Process fuel from the catalyst bed enters the upper tube 74 through the perforated section 64 and flows downwardly into the lower tube 76 to fill the latter in a relatively quiescent manner. The lower tube 76 is dead ended and thus serves as a trap for collecting catalyst pellet fines which may become entrained in the process fuel stream as the latter passes through the catalyst bed. The process fuel stream spills out over the top of the tube 76 and flows through the regenerator chamber 79 where the thermal energy of the process gas is transferred back into the incoming process flow stream to assist in supplying the necessary heat of reaction.

To assemble the reformer, reformer tubes 30 are located within the associated apertures in the plate 84 and then attached by welds 31 to fix their locations. Then the assembled regenerator tubes 50 are inserted into the reformer tubes 30 and the combination inverted. In the inverted condition, the regenerator tubes 50 are supported by contact between the cross member 66 and the end cap 38. The spacers 73 hold the regenerator tubes 50 centered within the reformer tubes 30 allowing the annular spaces 70 therebetween to be filled with the catalyst pellets 72. After a proper amount of the catalyst has been introduced into the spaces 70, the catalyst support assembly is inserted into the spaces 70. The catalyst support assembly includes an annular perforated plate 81 which is welded to support rods 75. The rods 75 are supported by an annular plate 80. The lower boundary of the spaces 70 are sealed by welding the inside edges of the solid discs 77 to the regenerator tubes 50 by means of welds 37, and by welding the outside edges of the discs 77 to the lower support plate 86 by means of welds 35. Once so sealed, the reformer can be righted whereupon the catalyst pellets 72 will essentially fill the spaces 70.

The burner cavity 100 consists of lower and upper regions 99 and 101 respectively, with the upper portions of each catalyst tube assembly 14 projecting into the lower region 99 of the burner cavity 100. The upper region 101, which is the open region, is sized so that the volume of this region of the burner cavity 100 ensures complete burner gas combustion, and therefore, low emissions. In addition, the burner cavity width above the catalyst tubes in either the upper or lower regions 101 and 99 is sized to promote uniform flow to each of the individual tube assemblies 14 forming the tube array. The lower region 99 which contains the projecting tube array, is sized to maximize heat transfer to the tube assemblies 14. The perimeter of the lower region 99 of the burner cavity 100 is bounded by a hexagonal insulation wall 102. The wall 102 is formed of panels of ceramic fiber insulation board. The panels are positioned in close facing relationship to the six sides of the hexagonal array of catalyst tube assemblies 14. An exemplary spacing between the wall 102 and the perimeter catalyst tube assemblies 14 is approximately the same as the spacing between adjacent catalyst tube assemblies 14 in the array. The hexagonal configuration of the wall 102, and its close proximity to the catalyst tube assembly array maintains temperature uniformity across the array so that the perimeter catalyst tube assemblies 14 and, more particularly, their outboard sides, will be at substantially the same temperature as the interior catalyst tube assemblies 14, so as to maximize system efficiency. The upper end of the wall 102 extends above the upper ends of the catalyst tube assemblies 14, and defines the border between the upper and lower regions 101 and 99 of the burner cavity 100. An additional element which is not shown in the drawings, but which may be included in the assembly, are ceramic caps for the catalyst tube assemblies 14, which caps are described in U.S. Pat. No. 4,740,357, which is incorporated herein in its entirety.

Immediately below the lower region 99 of the burner cavity 100 is an enhanced heating portion 104 of the furnace 12 which is configured so as to enhance heat transfer from the burner gas to the catalyst tube assemblies 14. In the enhanced heating portion 104, each catalyst tube assembly 14 is located within an associated concentric sleeve 106. The sleeves 106 have inner diameters which form annular spaces 108 between the inner surfaces of the sleeves 106 and the outer surfaces of the reformer catalyst 30. A support plate 112 supports a ceramic fiber insulation 114 which fills the space between the sleeves 106 and extends upward to the boundary 110.

FIGS. 1, 1A, 4 and 5 disclose details of the catalyst tube assemblies 14, and the manner in which they are mounted in the reformer apparatus 10. Upper and lower plates 84 and 86 span the reformer housing 12 proximate the lower end wall 95 of the housing 12. Each plate 84 and 86 has a plurality of apertures 85 and 87 respectively. Each catalyst tube assembly 14 extends through associated apertures 85 in the upper plate 84 and associated apertures 87 in the lower plate 86. The catalyst tubes 30 are welded to the upper plate 84 via welds 31 and also welded to the lower plate 86 via welds 33. It will be noted that the catalyst tubes 30 combine with the plates 84 and 86 to form a rigid structure analogous to a honeycomb panel, in which the plates 84 and 86 are the face sheets, and the catalyst tubes 30, which extend between the plates 84 and 86, act as the core. This welded structure which serves as the process gas inlet manifold is also operable to support the catalyst tube assemblies 14 during normal operation and during transient transportation and seismic loads. The weight of the internal components in the catalyst tube assemblies 14, which consists of the catalyst beds 72, the catalyst support plates 81, the support rods 75, and the regenerator tubes 50 is supported by annular plates 77, the internal diameters of which are welded to the regenerator tubes 50 by welds 37, and the outer diameters of which are welded to the plate 86 by welds 35. The outer edge portions of the upper and lower plates 84 and 86 are supported by surfaces 92 and 98, respectively, on the reformer outer shell 94 and 96. The fact that the plates 84 and 86 are secured to the reformer shell side wall 94 and 96 ensures that the weight of the catalyst tube assemblies 14 is transferred outwardly to the side wall 94, 96 by the plates 84 and 86. The tube 76 is secured to the tube 50 by means of a plurality of spaced-apart clips 7 which allow the reformed gas stream to flow from the annulus 79 into the manifold 144.

The assembly 10 operates as follows. Burner fuel enters the system through the burner fuel inlet 20 which is located at a height approximately even with a lower region 99 of the burner cavity 100. The fuel enters an annular manifold 120 which leads to an annular passageway 122. Walls 123 and 125, which define the passageway 122, encircle the array of catalyst tubes 14 so as to allow the fuel to evenly descend through the passageway 122. The fuel flows downwardly through the passageway 122, acquiring heat as it progresses downwardly to an annular manifold 124 at a lower portion of the enhanced heating portion 104.

A vertical conduit 126 then ducts the preheated burner fuel upward from the manifold 124 to a fuel manifold 128 located in upper region 101 of the burner cavity 100. The burner fuel passes from the manifold 128 through tubular nozzles 130 which extend downwardly from a lower wall of the manifold 128. The nozzles 130 pass through an air manifold 132 which is coupled to the inlet 22 and through one or more insulating panels between the upper region 101 of the burner cavity 100 and the air manifold 132. Apertures in such panels have sufficient clearance around the nozzles 130 to define corresponding annular passageways through which air is drawn from the air manifold 132 to combustor with the gas introduced to the burner cavity 100 through the nozzles 130. A start burner 140 is provided in a side wall of the burner cavity 100 above the catalyst tube assemblies 14 and a flame sensor 141 is provided on an opposite side of the burner cavity 100. Arrow C in FIG. 1 indicates the direction of flow of the start burner gas.

The hot combustion gases from the burner fuel and air proceed downward through the burner cavity 100, through inlets to the annular spaces 108 at the upper ends of the associated sleeves 106 thereby transferring heat to the catalyst tube assemblies 14. Optionally, the spaces 108 are maintained as shown in U.S. Pat. No. 4,847,051, the disclosure of which is incorporated herein in its entirety. When the combustion gases leave the annular space 108 at the lower end of the sleeve 106, they enter an exhaust plenum 152 between the plate 112 and the plate 84. The burner gases proceed to the outer perimeter of the plenum 152 and upward therefrom through an annular passageway 146 immediately inboard of the passageway 122. The burner gases moving upward through the passageway 146 transfer heat to the incoming heating fuel proceeding downward through the passageway 122. Upon reaching the upper end of the passageway 146, the burner gases are collected in an annular collection space 148 and therefrom exit via the exhaust outlet 24.

The process fuel enters through the inlet 16 and is directed via appropriate conduits to the process fuel gas inlet plenum 150 between the plates 84 and 86. From the plenum 150, the process fuel gas passes through openings in the lower portion of the reformer tube 30 which is located within the plenum 150. The process fuel proceeds upward through the catalyst bed, receiving heat both from the downward flowing burner gas in the annular space 108 outboard of the reaction chamber, and from the downward flowing processed gas in the regeneration chamber to be described below. The process fuel gas exits the upper surface of the catalyst bed in the processed state and passes through the holes in the perforated upper section 64 of the regenerator tube 50. The processed gas then passes downward through the upper filter tube 74. Upon exiting the lower end of the tube 74, the processed gas must change direction, proceeding upward through the annular space 78 as indicated by arrows D. During this flow direction change, particulate matter (e.g., certain reaction byproducts, catalyst particles, and the like) will fall to the closed lower end of the lower tube 76 and collect there. After passing through the open upper end of the tube 76, the flow of processed gas again reverses direction and flows downwardly through the regeneration chamber 79. During this downward flow, the processed gas transfers heat to the incoming process fuel in the reaction chamber immediately outboard thereof. At the lower end of the regenerator tube, the processed gas enters a processed fuel outlet plenum 144 between the plate 86 and a bottom of the reformer housing 12. From the plenum 144, the processed gas proceeds through conduits to the processed fuel outlet 18.

Additionally, the structural coupling of the plates which define the process fuel inlet plenum increases the overall rigidity of the system, allowing for use of thinner and lighter material; reducing the possibility of damage during transport; and reducing the possibility of damage during use. A rigid tube support structure is required to minimize the tendency of the upper ends of the catalyst tubes to move toward each other as the tube support structure deflects under dead weight loads at elevated temperatures. Excess deflection can lead to catalyst tube temperature maldistribution by causing non-uniformity in the various gas flow paths at the upper end of the catalyst tubes.

Another of the areas of damage during reformer use involves crushing of the catalyst material. The more rigid mounting of the catalyst tubes can reduce their movement relative to the regenerator tubes. Such movement may be caused by vibration or by thermal cycling as the reformer is used. Such relative movement first allows shifting of the catalyst, followed by crushing of the catalyst as the relative movement reverses and the tubes seek to resume their previous relative position. The frustoconical intermediate and upper portions of the regenerator tube allow for the storage of an reserve amount of catalyst which compensates for catalyst pellet crushing or slump, should such occur, and also stabilizes the upper portion of the catalyst bed against fluidization during operation of the system.

The aforesaid design results in a nineteen catalyst tube array reformer assembly employing four inch diameter catalyst tubes. With the four inch diameter tubes, the center void space used as a fines catcher is markedly reduced. Since the center void space is unused volume, it should be made as small as possible. A small center also reduces catalyst crushing effects since the amount of thermal growth in the catalyst cavity annulus is proportional to the tube diameter. Keys to maintaining operating temperature uniformity in the catalyst tubes are the hexagonal shape in the burner cavity, the rigidity of the tube support, and the provision of a multiple burner tube array above the catalyst tubes.

Since many changes and variations of the disclosed embodiment of the invention may be made without departing from the inventive concept, it is not intended to limit the invention otherwise than as required by the appended claims.

What is claimed is:

1. A hydrocarbon fuel gas reformer assembly for converting a raw fuel gas to a hydrogen-enriched process gas which is suitable for use in a fuel cell power plant, said assembly comprising:
   a) a thermally insulated housing;
   b) a plurality of catalyst tubes disposed in said housing;
   c) an annular catalyst bed disposed in each of said catalyst tubes;
   d) a central regenerator tube assembly in each of said catalyst tubes, said regenerator tube assemblies being disposed radially inwardly of said catalyst beds, each of said regenerator tube assemblies including a first cylindrical portion and a second inwardly tapered frusto-conical portion which is operable to hold an excess amount of catalyst in said catalyst tubes, and;
   e) said housing including a lowermost manifold for receiving process gas from said catalyst tubes, said lowermost manifold being formed by a bottom wall of said housing and a first plate spaced apart from said bottom wall, said first plate being connected to a side wall of said housing, and said regenerator tube assemblies being connected to first plate whereby weight of said regenerator tube assemblies is borne by said first plate and by said side wall of said housing.

2. The hydrocarbon fuel gas reformer assembly of claim 1 wherein said tapered portions are covered by a perforated plate to allow gas to flow from said catalyst beds into said regenerator tube assemblies.

3. The hydrocarbon fuel gas reformer assembly of claim 2 wherein said catalyst tubes are provided with excess catalyst which is disposed outwardly of said tapered frustoconical portions of said regenerator tube assemblies, and which excess catalyst prevents a decrease in reformer performance due to catalyst compaction.

4. The hydrocarbon fuel gas reformer assembly of claim 1 wherein said tapered portions provide a process gas flow channel that minimizes catalyst bed fluidization during operation of the assembly.

5. The hydrocarbon fuel gas reformer assembly of claim 1 wherein said housing includes a second manifold adjacent to said first manifold for receiving the raw fuel gas, said second manifold being formed by said first plate and a second plate spaced apart from said first plate, said second plate being connected to said side wall of said housing, and said catalyst tubes being connected to said first and second plates whereby weight of said catalyst tubes and said catalyst beds is borne by said first and second plates and by said side wall of said housing.

6. The hydrocarbon fuel gas reformer assembly of claim 5 wherein said second manifold opens into said catalyst beds.

7. A hydrocarbon fuel gas reformer assembly for converting a raw fuel gas to a hydrogen-enriched process gas which is suitable for use in a fuel cell power plant, said assembly comprising:
   a) a thermally insulated housing, said housing having a bottom wall and a side wall;
   b) a plurality of catalyst tubes disposed in said housing;
   c) an annular catalyst bed disposed in each of said catalyst tubes;
   d) a regenerator tube assembly in each of said catalyst tubes, said regenerator tube assemblies being disposed radially inwardly of said catalyst beds; and
   e) said housing including a lowermost manifold for receiving process gas from said catalyst tubes, said lowermost manifold being formed by said bottom wall of said housing and a first plate spaced apart from said bottom wall, said first plate being connected to a side wall of said housing, and said regenerator tube assemblies being connected to first plate whereby weight of said regenerator tube assemblies is borne by said first plate and by said side wall of said housing.

8. The hydrocarbon fuel gas reformer assembly of claim 7 further comprising a second manifold adjacent to said first manifold for receiving the raw fuel gas, said second manifold being formed by said first plate and a second plate spaced apart from said first plate, said second plate being connected to said side wall of said housing, and said catalyst tubes being connected to said first and second plates whereby weight of said catalyst tubes and said catalyst beds is also borne by said side wall of said housing.

9. A hydrocarbon fuel gas reformer assembly for converting a raw fuel gas to a hydrogen-enriched process gas which is suitable for use in a fuel cell power plant, said assembly comprising:
   a) a thermally insulated housing, said housing having a bottom wall and a side wall;
   b) a plurality of catalyst tubes disposed in said housing;
   c) an annular catalyst bed disposed in each of said catalyst tubes;
   d) a regenerator tube assembly in each of said catalyst tubes, said regenerator tube assemblies being disposed radially inwardly of said catalyst beds;
   e) said housing including a lowermost manifold for receiving process gas from said catalyst tubes, said lowermost manifold being formed by said bottom wall of said housing and a first plate spaced apart from said bottom wall, said first plate being connected to a side wall of said housing, and said regenerator tube assemblies being connected to first plate whereby the weight of said regenerator tube assemblies is borne by said side wall of said housing;
   f) a second manifold adjacent to said first manifold for receiving the raw fuel gas, said second manifold being formed by said first plate and a second plate spaced apart from said first plate, said second plate being connected to said side wall of said housing, and said catalyst tubes being connected to said first and second plates whereby the weight of said catalyst tubes is borne by said side wall of said housing; and
   g) perforated plates supporting each of said catalyst beds and allowing passage of the raw fuel gas into said catalyst beds, said perforated plates being supported by said first plate whereby weight of said catalyst beds is borne by said first plate and by said side wall of said housing.

10. The hydrocarbon fuel gas reformer assembly of claim 9 wherein said housing includes a top wall and said assembly further comprises:
   i) a burner gas fuel manifold in said housing, said burner gas fuel manifold being formed by said top wall and a first partition spaced apart from said top wall and connected to said side wall;
   ii) a burner gas oxidant manifold in said housing, said oxidant manifold being formed by said first partition and a second partition spaced apart from said first partition;
   iii) a burner gas fuel combustion chamber in said housing adjacent to said oxidant manifold and above said catalyst tubes;

iv) a plurality of burner gas fuel and oxidant jets opening through said second partition, said jets being positioned so as to deliver a dispersed supply of burner gas fuel and oxidant to said catalyst tubes to evenly heat the latter, and;

v) a burner gas fuel and oxidant exhaust manifold in said housing, said exhaust manifold being adjacent to said second manifold and being defined by said second plate and a third plate spaced apart from said second plate, said third plate being connected to said side wall of said housing, and said catalyst tubes being connected to said third plate whereby weight of said catalyst tubes is also borne by said third plate and by said side wall of said housing.

* * * * *